US009088733B2

(12) United States Patent
Van Natter

(10) Patent No.: US 9,088,733 B2
(45) Date of Patent: Jul. 21, 2015

(54) TRUSTED EVIDENCE CAMERAS AND RELATED METHODS AND COMPUTER PROGRAM PRODUCTS

(75) Inventor: Douglas Van Natter, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2395 days.

(21) Appl. No.: 11/475,358

(22) Filed: Jun. 27, 2006

(65) Prior Publication Data

US 2007/0300074 A1   Dec. 27, 2007

(51) Int. Cl.
*G06F 7/04* (2006.01)
*H04N 1/32* (2006.01)
*H04N 101/00* (2006.01)

(52) U.S. Cl.
CPC ........ *H04N 1/32101* (2013.01); *H04N 2101/00* (2013.01); *H04N 2201/3236* (2013.01); *H04N 2201/3253* (2013.01); *H04N 2201/3274* (2013.01); *H04N 2201/3281* (2013.01)

(58) Field of Classification Search
CPC .............. G06F 21/10; H04N 1/32101; H04N 2101/00; H04N 2201/3253; H04N 2201/3274
USPC ....................................................... 726/26, 4
See application file for complete search history.

(56) References Cited

U.S. PATENT DOCUMENTS

| 5,499,294 A * | 3/1996 | Friedman ...................... 713/179 |
| 7,716,747 B2 * | 5/2010 | Wakao et al. ................... 726/30 |
| 8,161,364 B1 * | 4/2012 | Szeremi ........................ 714/807 |
| 2004/0039929 A1 * | 2/2004 | Decime .......................... 713/193 |
| 2007/0217763 A1 * | 9/2007 | Siemens et al. ............... 386/112 |

OTHER PUBLICATIONS

Friedman, The Trustworthy Digtal Camera: Restoring Credibility to the Photographic Image, 1993, IEEE Transactions on Consumer Electronics, vol. 39 Issue 4, retrieved from the Internet <URL: ieeexplore.ieee.org/xpls/abs_all.jsp?arnumber=267415&tag=1>, pp. 1-6 as printed.*
Canon Data Verification Kit DVK-E2 (website—http://www.dpreview.com/news/0401/04012903canondvke2.asp), Jan. 29, 2004.

* cited by examiner

*Primary Examiner* — Aravind Moorthy
*Assistant Examiner* — Peiliang Pan
(74) *Attorney, Agent, or Firm* — Myers Bigel Sibley & Sajovec

(57) ABSTRACT

Digital Cameras configured to verify authenticity of digital photos taken with the digital camera and related methods and computer program products are provided. GPS information associated with a photograph taken with the digital camera is obtained. A checksum of pixels that make up the photograph and the obtained GPS information is generated. The generated checksum is encrypted using a private key associated with the digital camera so as to allow verification that the photograph has not been modified.

15 Claims, 3 Drawing Sheets

TRUSTED EVIDENCE CAMERAS AND RELATED METHODS AND COMPUTER PROGRAM PRODUCTS

FIELD OF THE INVENTION

The present invention generally relates to cameras and, more particularly, to digital cameras and related methods and computer program products.

BACKGROUND OF THE INVENTION

Crime scene investigators, law enforcement personnel and private security agents use cameras to photograph crime or incident scenes. The authenticity of these scene photographs typically must be proven and a chain of evidence, i.e. a log of who had access to the photographs and when, established. In other words, the investigator must show that the photograph has not been altered. Traditionally, film cameras have been used because it is difficult to modify a film negative, whereas photographs taken with digital cameras can be easily manipulated using, for example, personal computers.

However, photographs taken with film cameras (or traditional cameras) may not be as convenient as digital photographs. For example, traditional photographs cannot typically be stored in computer files or emailed to others without first scanning them into the computer. Once scanned, they could potentially be manipulated, like digital photos. Thus, scanning the photograph and then saving or emailing it may also not be a valid option as the authenticity of the scanned and/or digital photographs may be questioned and, therefore, may not be admitted as evidence.

SUMMARY OF THE INVENTION

Some embodiments of the present invention provide methods for verifying authenticity of digital photos taken with a digital camera. GPS information associated with a photograph taken with the digital camera is obtained. A checksum of pixels that make up the photograph and the obtained GPS information is generated. The generated checksum is encrypted using a private key associated with the digital camera so as to allow verification that the photograph has not been modified.

In further embodiments of the present invention, the obtained GPS information may be stored in metadata associated with the photograph.

In still further embodiments of the present invention, a first checksum of the pixels that make up the photograph may be generated and stored in metadata associated with the photograph. Then, a second checksum of the first checksum and the obtained GPS information may be generated. The second checksum may be encrypted using the private key.

In some embodiments of the present invention, verification that the photograph has not been modified may be obtained. In certain embodiments, the encrypted checksum may be decrypted using a public key and the decrypted checksum may be compared to the generated checksum so as to allow verification that the photograph has not been modified. In further embodiments, the checksum of the pixels and the GPS information may be recalculated and the recalculated checksum may be compared to the generated checksum so as to allow verification that the photograph has not been modified.

In further embodiments of the present invention, the encrypted checksum may be stored in metadata associated with the photograph.

Although embodiments of the present invention are discussed herein with respect to method embodiments, related digital cameras and computer program products are also provided.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

Figure 1:
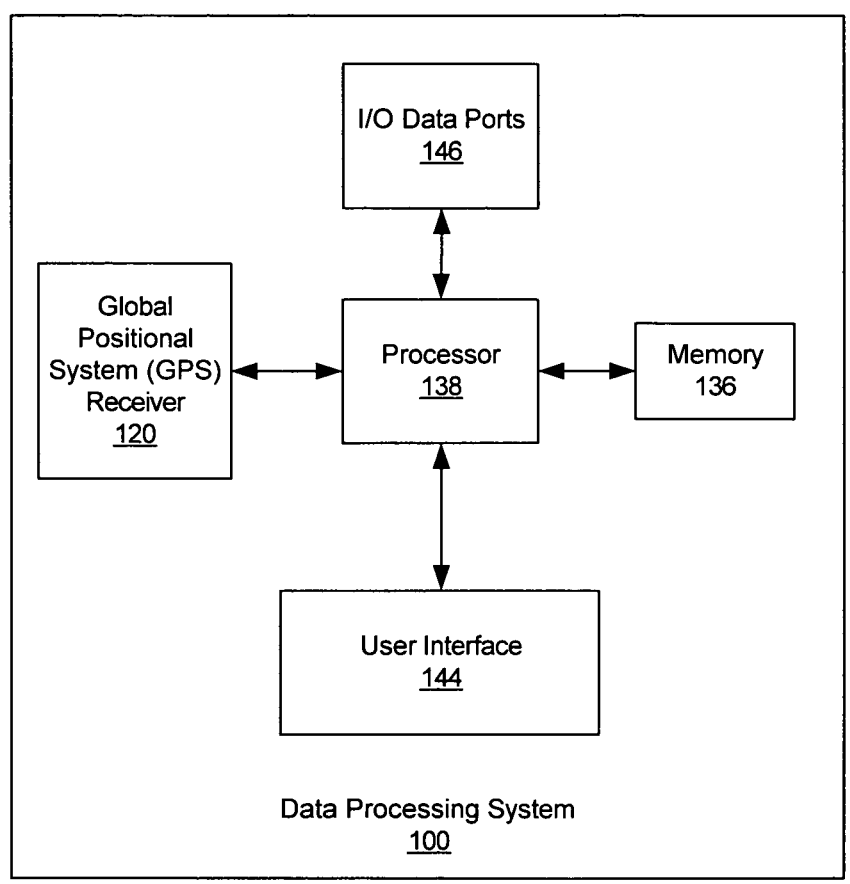
FIG. 1 is a block diagram of a data processing system suitable for use in digital cameras according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as digital cameras methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The use of digital cameras in the field of evidence to photograph crime and/or incident scenes may pose authenticity problems, which may make these photographs inadmissible in a courtroom environment. Therefore, according to some embodiments of the present invention, digital images may be provided that can be reliably shown to be unmodified. Using digital cameras according to some embodiments of the present invention may provide advantages over the use of traditional cameras. For example, digital photos may be less expensive, easier to store electronically, stored with corresponding case notes in an electronic filing system, emailed to the parties involved and the like.

Details of various embodiments of the present invention will be discussed below with respect to FIGS. 1 through 4. Embodiments of the present invention provide digital cameras, methods and computer program products for verifying authenticity of photographs taken with digital cameras, i.e., digital or electronic photographs as opposed to traditional film photographs. Some embodiments of the present invention may provide digital cameras and related methods and computer program products that are configured to obtain GPS information associated with a photograph taken with the digital camera, generate a checksum of the pixels in the photograph and the GPS information, and encrypt the checksum using a private key known to the digital camera. The authenticity of the photograph may be verified by decrypting the encrypted checksum using a public key and verifying that the checksums are the same and/or recalculating the checksum and comparing it to the original checksum to verify that the pixels in the photograph have not been changed. Accordingly, some embodiments of the present invention may, for example, provide a validation mechanism to check the authenticity of digital/electronic photographs for use as evidence as discussed further herein.

As used herein, "digital camera" refers to any device capable of taking digital or electronic photographs. For example, digital cameras as used herein are not limited to camera devices. The digital camera function may be included in another device, such as a portable electronic device, without departing from the scope of the present invention.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer and/or calendar; and/or conventional laptop and/or palmtop computers or other appliances, which include a radio frequency receiver. As used herein, "mobile terminals" may be portable, transportable, installed in a vehicle (aeronautical, maritime, or land-based), or situated and/or configured to operate locally and/or in a distributed fashion at any other location(s) on earth and/or in space.

Referring now to FIG. 1, an exemplary embodiment of a data processing system 100 suitable for use in a digital camera in accordance with some embodiments of the present invention will be discussed. The data processing system 100 typically includes a user interface 144, such as a keyboard or keypad, I/O data ports 146, a global positioning system (GPS) receiver 120, and a memory 136 that communicate with a processor 138. The I/O data ports 146 can be used to transfer information between the data processing system 100 and another computer system or a network. These components may be conventional components, such as those used in many conventional data processing systems, which may be configured to operate as described herein.

Figure 2:
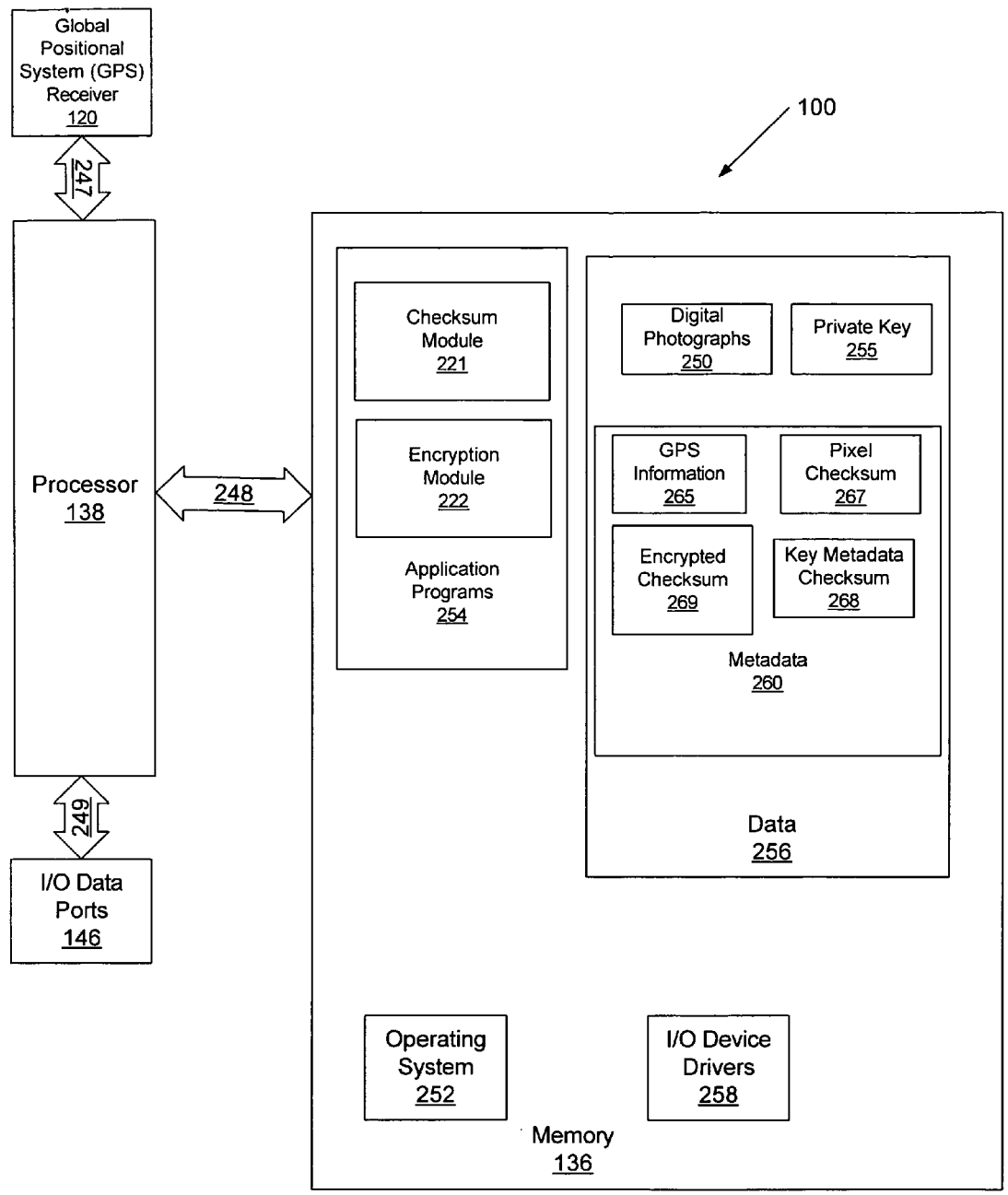
FIG. 2 is a more detailed block diagram of data processing systems according to some embodiments of the present invention.

Referring now to FIG. 2, a more detailed block diagram of the data processing system 100 in accordance with some embodiments of the present invention will be discussed. The processor 138 communicates with the memory 136 via an address/data bus 248, the I/O data ports 146 via an address/date bus 249 and the GPS receiver 120 via an address/data bus 247. The processor 138 can be any commercially available or custom microprocessor. The memory 136 is representative of the overall hierarchy of memory devices containing the software and data used to implement the functionality of the data processing system 100. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 100: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 100 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

It will be understood that digital cameras according to some embodiments of the present invention may not include an operating system 252 and/or input/output (I/O) device drivers 258 as discussed above. In some embodiments of the present invention, digital cameras may use software in the camera configured to run the operations of the camera without departing from the scope of the present invention.

As illustrated in FIG. 2, the data 256 according to some embodiments of the present invention may include digital photographs 250, a private key 255, and metadata 260. The metadata 260 may further include GPS information 265, a pixel checksum 267, key metadata checksum 268 and an encrypted checksum 269. The details with respect to this data will be discussed further below.

Although the data 256 only includes single digital photographs 250, private key 255, key metadata checksum 268, GPS information 265, pixel checksum 267 and encrypted checksum 269 files, embodiments of the present invention are not limited to this configuration. Two or more of any of these files may be provided without departing from the scope of the present invention.

As further illustrated in FIG. 2, the application programs 254 may include a checksum module 221 and an encryption module 22 according to some embodiments of the present invention. While the present invention is illustrated, for example, with reference to the checksum module 221 and the encryption module being application programs in FIG. 2, as will be appreciated by those of skill in the art, other configurations may also be utilized while still benefiting from the teachings of the present invention. For example, the checksum module 221 and the encryption module 222 may also be incorporated into the operating system 252 or other such logical division of the data processing system 100. Thus, the present invention should not be construed as limited to the configuration of FIG. 2, but is intended to encompass any configuration capable of carrying out the operations described herein.

Furthermore, while the checksum module 221 and the encryption module 222 are illustrated in a single data processing system, as will be appreciated by those of skill in the art, such functionality may be distributed across one or more data processing systems. Thus, the present invention should not be construed as limited to the configuration illustrated in FIGS. 1 through 2 but may be provided by other arrangements and/or divisions of function between data processing systems.

Referring now to FIGS. 1 and 2, a user of the digital camera according to some embodiments of the present invention, such as crime scene investigators, law enforcement personnel and/or private security agents, may take a photograph using the digital camera and store the photograph as an electronic photograph 250. The GPS receiver 120 may be configured to obtain GPS information 265, such as date, time and/or location information, associated with the photograph and store this information in the metadata 260 associated with the photograph. The location information may include, for example, longitude and latitude information associated with the location at which the photograph was taken. The metadata may be stored as, for example, Joint Photographic Experts Group (JPEG) files and may include information such as aperture, shutter speed, and camera model as well as the other metadata 260 illustrated in FIG. 2.

The checksum module 221 may be configured to calculate a checksum of the pixels associated with the photograph, the actual bits that make up the photograph and store the pixel checksum 267 in the metadata 260 associated with the photograph. A checksum is a mathematical calculation involving all the bits used to make up a set of data, for example, the photograph. Checksums and methods of calculating the same are known to those having skill in the art and, therefore, the details of the checksum will not be discussed further herein. In some embodiments of the present invention, the checksum for the pixels of the photograph may be used to verify that the photograph has not been modified. For example, the checksum may be recalculated on the existing photograph and if the value of the recalculated checksum is different than the value of the original checksum, this would be an indication that the photograph had been altered or modified.

In some embodiments of the present invention, the checksum module 221 may also be configured to calculate another checksum of key metadata fields 268, for example, the pixel checksum 267 and the GPS information 265. Then, the encryption module 222 may be configured to encrypt the checksum of the key metadata fields 268 using a private key 255. As will be understood by those having skill in the art, private key encryption schemes have both a private key, which is known only to the originator (the digital camera) and a public key, which is known to everyone else. Thus, according to some embodiments of the present invention, the encryption module 222 may use the private key to encrypt the checksum of key metadata fields 268 and store the encrypted checksum 269 in the metadata 260 associated with the photograph.

Thus, some embodiments of the present invention may provide a digital photograph having associated metadata fields, the presence of which may allow the authenticity of the photograph to be verified. For example, the photograph can be viewed, stored and/or emailed in a traditional manner. However, according to some embodiments of the present invention, if the photograph is modified by anyone, the photograph checksum will no longer be valid. In other words, if the checksum is recalculated on photograph that has been modified, it will not match the original checksum.

According to some embodiments of the present invention, the public key associated with a digital camera may be used to decrypt the encrypted metadata 269. If the public key can be successfully used, it may illustrate that the original encryption was done using the private key known only to the camera. Furthermore, if the decrypted data matches the unencrypted data, this may show that the photograph has not been modified and that it was indeed taken at the date, time, and location specified by the metadata.

Figures 3, 4:
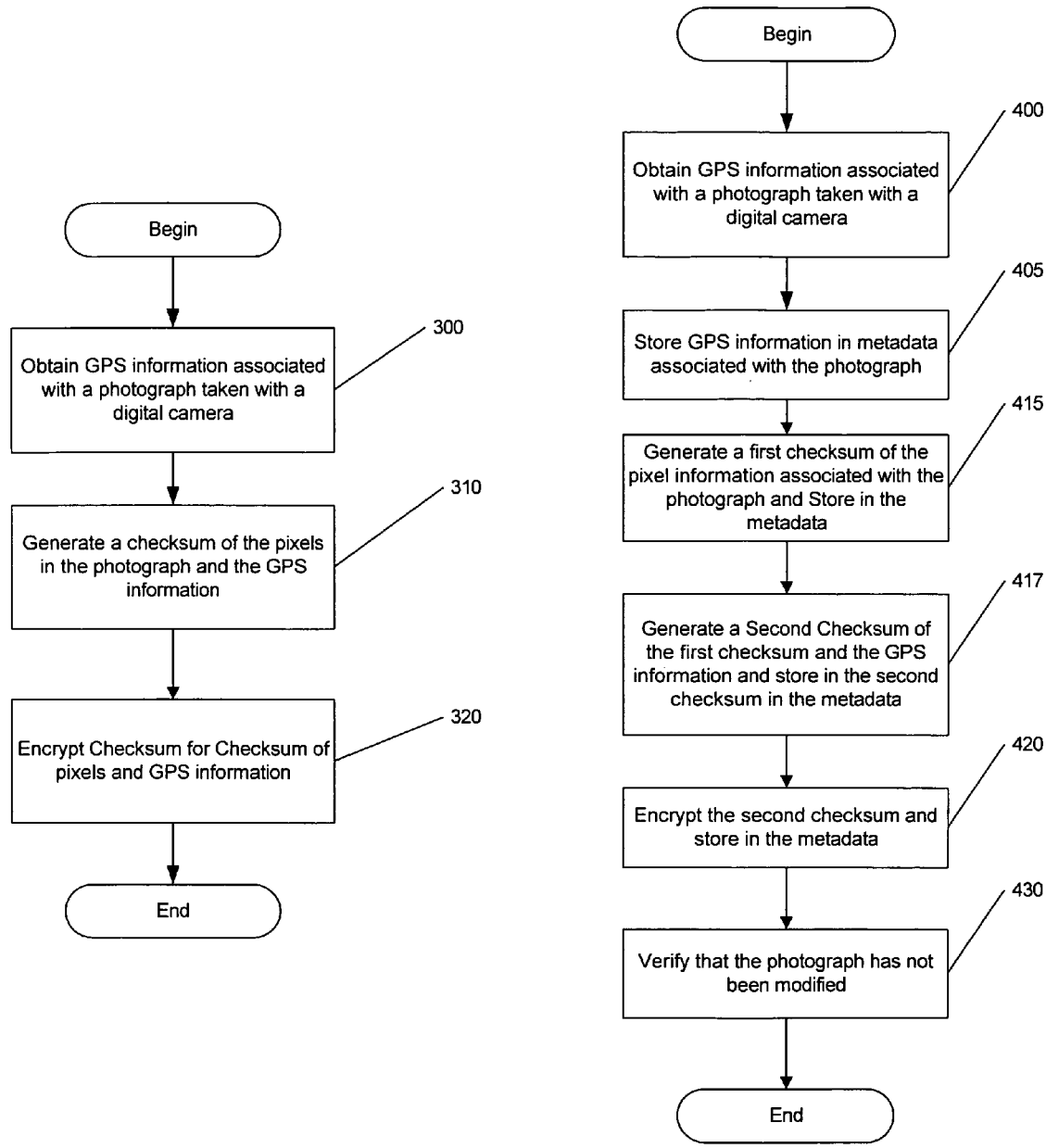
FIGS. 3 through 4 are flowcharts illustrating operations for verifying authenticity of digital photos taken with a digital camera according to various embodiments of the present invention.

Operations according to some embodiments of the present invention for verifying authenticity of digital photos taken with a digital camera will now be discussed with respect to the flowcharts of FIGS. 2 and 3. Referring first to the flowchart of FIG. 3, operations begin at block 300 by obtaining GPS information associated with a photograph taken with the digital camera. As used herein, GPS information refers to any information that may be provided by a GPS system, for example, date, time and/or location information associated with the photograph. A checksum of pixels that make up the photograph and the obtained GPS information is generated (block 310). The generated checksum is encrypted with a private key associated with the digital camera so as to allow verification that the photograph has not been modified (block 320).

Operations according to further embodiments of the present invention will now be discussed with respect to the flowchart of FIG. 4. As illustrated in FIG. 4, operations begin at block 400 by obtaining GPS information associated with a photograph taken with a digital camera. The obtained GPS information may be stored in metadata associated with the photograph (block 405). A first checksum of the pixels that make up the photograph may be generated and stored in the metadata associated with the photograph (block 415). A second checksum of the first checksum and the obtained GPS information may be generated and stored in the metadata (block 417). The second checksum may be encrypted using the private key and the encrypted checksum may be stored in the metadata (block 420).

The authenticity of the photograph may be verified, i.e., verify that the photograph has not been modified (block 430). In some embodiments of the present invention, the encrypted checksum may be decrypted using a public key and the decrypted checksum may be compared to the generated checksum so as to allow verification that the photograph has not been modified. In further embodiments of the present invention, the checksum of the pixels and the GPS information may be recalculated and the recalculated checksum may be compared to the original checksum so as to allow verification that the photograph has not been modified.

According to some embodiments of the present invention, changes may be made to the image. For example, the image may be made brighter, the contrast and color of the image be adjusted, the image may be corrected or cropped. These changes may make the image more clear to a viewer. Some image manipulation programs can make these types of changes not by actually changing the image, but by saving a change history or recipe for converting the original image into a more usable one. It will be understood that embodiments of the present invention do not prohibit the ability to make changes of this type provided the original image remains unmodified. The change history may become part of the chain of evidence. The specific changes could be viewed and the effects reproduced if there was a question about the authenticity of an image In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A digital camera comprising:
   a global positioning system receiver configured to obtain global positioning system information associated with a photograph taken with the digital camera;
   a checksum module configured to:
      generate a first checksum of pixels that make up the photograph and store the first checksum in metadata associated with the photograph; and then
      generate a second checksum of the first checksum and the global positioning system information; and
   an encryption module configured to encrypt the checksum using a private key associated with the digital camera to provide an encrypted checksum so as to allow verification that the photograph has not been modified,
      wherein the encryption module is configured to encrypt the second checksum using the private key to provide the encrypted checksum.

2. The digital camera of claim 1, wherein the global positioning system receiver is further configured to store the global positioning system information in metadata associated with the photograph.

3. The digital camera of claim 1, wherein the encryption module is further configured to store the encrypted checksum in metadata associated with the photograph.

4. A method of verifying authenticity of digital photos taken with a digital camera, the method comprising:
   obtaining global positioning system information associated with a photograph taken with the digital camera;
   generating a first checksum of pixels that make UP the photograph and storing the first checksum in metadata associated with the photograph; and then
   generating a second checksum of the first checksum and the global positioning system information; and
   encrypting the checksum using a private key associated with the digital camera so as to allow verification that the photograph has not been modified,
   wherein the encrypting further comprises encrypting the second checksum using the private key to provide an encrypted checksum; and
   wherein at least one of the obtaining, generating and encrypting is performed by at least on processor associated with the digital camera.

5. The method of claim 4, further comprising storing the global positioning system information in metadata associated with the photograph.

6. The method of claim 4, further comprising verifying that the photograph has not been modified.

7. The method of claim 6, wherein verifying further comprises:
   decrypting the encrypted checksum to generate a decrypted checksum using a public key; and
   comparing the decrypted checksum to the second checksum so as to allow verification that the photograph has not been modified.

8. The method of claim 6, further comprising:
   recalculating the second checksum of the first checksum and the global positioning system information to generate a recalculated checksum; and
   comparing the recalculated checksum to the second checksum so as to allow verification that the photograph has not been modified.

9. The method of claim 4, further comprising storing the checksum in metadata associated with the photograph.

10. A computer program product for verifying authenticity of digital photos taken with a digital camera, the computer program product comprising:
   a non-transitory computer readable storage medium having computer readable program code embodied in said medium, the computer readable program code comprising:
   computer readable program code configured to obtain global positioning system information associated with a photograph taken with the digital camera;
   computer readable program code configured to generate a first checksum of pixels that make UP the photograph and to store the first checksum in metadata associated with the photograph;

computer readable program code configured to generate a second checksum of the first checksum and the global positioning system information; and computer readable program code configured to encrypt the checksum using a private key associated with the digital camera to provide an encrypted checksum so as to allow verification that the photograph has not been modified, wherein the computer readable program code configured to encrypt further comprises computer readable program code configured to encrypt the second checksum using the private key to provide the encrypted checksum.

11. The computer program product of claim 10, further comprising computer readable program code configured to store the global positioning system information in metadata associated with the photograph.

12. The computer program product of claim 10, further comprising computer readable program code configured to verify that the photograph has not been modified.

13. The computer program product of claim 12, wherein the computer readable program code configured to verify further comprises:

computer readable program code configured to decrypt the encrypted checksum using a public key to generate a decrypted checksum; and computer readable program code configured to compare the decrypted checksum to the second checksum so as to allow verification that the photograph has not been modified.

14. The computer program product of claim 12, further comprising:

computer readable program code configured to recalculate the second checksum of the first checksum and the global positioning system information to generate a recalculated checksum; and computer readable program code configured to compare the recalculated checksum to the generated checksum so as to allow verification that the photograph has not been modified.

15. The computer program product of claim 10, further comprising computer readable program code configured to store the checksum in metadata associated with the photograph.

* * * * *

UNITED STATES PATENT AND TRADEMARK OFFICE
CERTIFICATE OF CORRECTION

| | | |
|---|---|---|
| PATENT NO. | : 9,088,733 B2 | Page 1 of 1 |
| APPLICATION NO. | : 11/475358 | |
| DATED | : July 21, 2015 | |
| INVENTOR(S) | : Douglas Van Natter | |

It is certified that error appears in the above-identified patent and that said Letters Patent is hereby corrected as shown below:

In the Claims:
Column 8, Claim 4, Line 19: Please correct "make UP" to read -- make up --

Column 8, Claim 4, Line 31: Please correct "on processor" to read -- one processor --

Column 8, Claim 10, Line 65: Please correct "that make UP the" to read -- that make up the --

Signed and Sealed this
First Day of December, 2015

Michelle K. Lee
*Director of the United States Patent and Trademark Office*